E. E. BURNS.
EDUCATIONAL APPLIANCE.
APPLICATION FILED AUG. 14, 1913.
1,182,636.
Patented May 9, 1916.
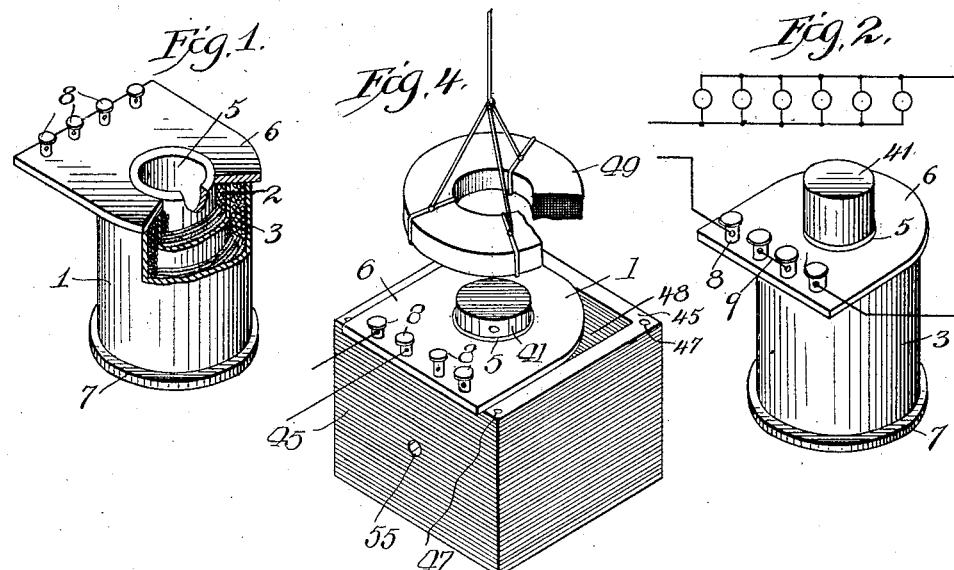
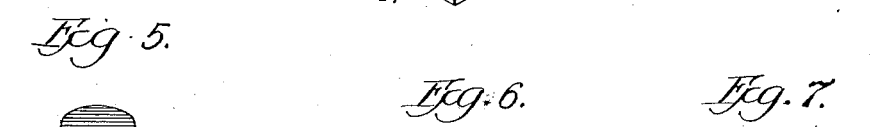
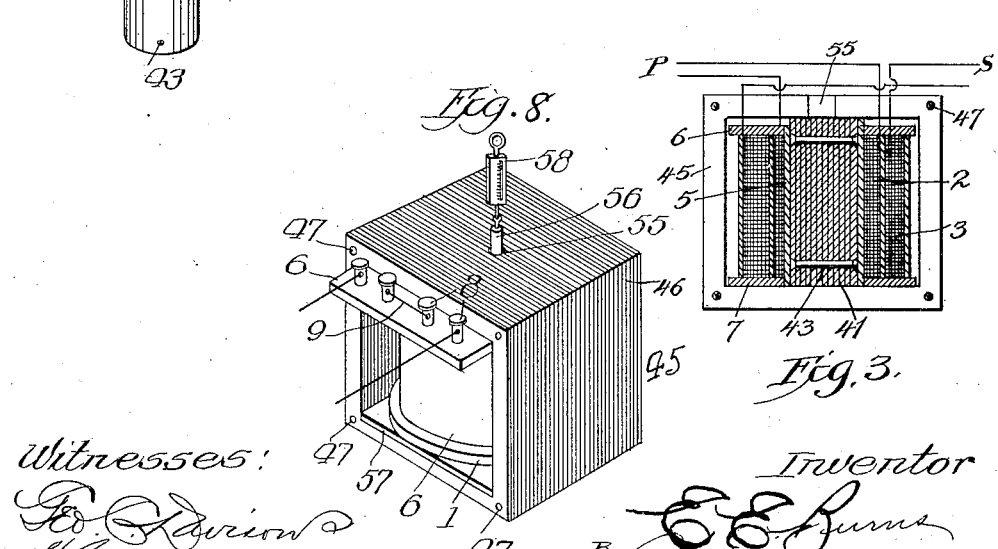

UNITED STATES PATENT OFFICE.

ELMER ELLSWORTH BURNS, OF BERWYN, ILLINOIS.

EDUCATIONAL APPLIANCE.

1,182,636.   Specification of Letters Patent.   Patented May 9, 1916.

Application filed August 14, 1913. Serial No. 784,707.

*To all whom it may concern:*

Be it known that I, ELMER ELLSWORTH BURNS, a citizen of the United States of America, and a resident of Berwyn, county of Cook, and State of Illinois, have invented certain new and useful Improvements in Educational Appliances, of which the following is a specification.

This invention relates to improvements in apparatus for teaching and demonstrating the principles of electro-dynamics.

The main objects of the invention are to provide improved means and methods for building up step by step the numerous concepts that are fundamental to a knowledge and understanding of this branch of learning; to provide an improved system of elementary parts or units of apparatus adapted for combination and coöperation in various ways for use in connection with lectures, and for laboratory experimental work in teaching and studying the principles of electricity and magnetism and their mutual relation to each other, particularly as manifest in electro-motive force; and to provide a system of electro-dynamic apparatus of the character stated adapted to cover a broad range of use but comprising a minimum of elementary parts.

Certain specific constructions and combinations of apparatus or elements embodying this invention are illustrated in the accompanying drawings in which—

Figure 1 is a broken perspective view of a hollow spool provided with a pair of coils, and terminals therefor. Fig. 2 is a perspective view of a choke-coil or dimmer applied to a lighting circuit and comprising the spool and coils shown in Fig. 1, and the core shown in Fig. 5. Fig. 3 is a central longitudinal section of a shell type transformer comprising the spool coils and core shown in Fig. 2. Fig. 4 is a perspective view of an apparatus for showing electro-dynamic repulsion effects and comprises the parts shown in Fig. 3, but in a different arrangement. Fig. 5 is a perspective view of a magnet core adapted to fit within the spool shown in Fig. 1. Fig. 6 is a perspective view of an annular conductor or closed ring. Fig. 7 is a perspective view of a disk-shaped conductor plate. Fig. 8 is a perspective view of an apparatus for conducting permeameter tests and comprises the parts shown in Fig. 3, except the central core, and with the addition of the rod to be tested.

Some of the elementary units or parts above mentioned are each adapted independently for numerous experiments and demonstrations illustrating the principles and features to which they are related, and showing the multiple character of some of the units. There are other experiments, however, which require two or more of the said units or parts in combination. Hence in order that a given unit of apparatus may suffice in as many different experiments as possible, the several parts are specially formed and arranged for multifarious interconnection and coöperation as will be more fully described.

Many experiments depend upon the interrelation and reactions between adjacent conductors as in concentric coils. In view of this fact the spool 1 shown in Fig. 1 is provided with a pair of coils or windings 2 and 3 arranged concentrically upon the hollow body or barrel 5 of the spool, and is held in place by the heads 6 and 7. Suitable terminals or binding posts 8 are mounted upon the outer side of the upper head 6 which is formed to project somewhat therefor, and the said coils are connected thereto. The coils may be joined in series by connecting the two middle posts as by a jumper wire 9 as shown in Fig. 8, or they may be otherwise connected as different experiments may require. The spool is non-magnetic and is preferably made of insulating material, but if metal parts are used they are made and arranged so as to be neutral.

In many of the practical applications of alternating current, it is at times necessary or desirable to vary the strength of the current in a circuit and to this end it is customary to use an inductive resistance of variable inductance. For the purpose of demonstrating the principles and applications of alternating current in this respect, the spool 1 and coils 2 and 3 thereon are provided with a suitable core 41 adapted and arranged for adjustable setting or movement longitudinally within the spool, in order to vary the inductance or choke-coil effect, such for instance as required in some forms of electric lighting circuits where a dimmer is required.

The core 41 is composed of longitudinal iron members, as laminations 42 secured together in a unitary manner as by rivets 43.

The principles of an ordinary static transformer having separate primary and secondary windings and a common core may be illustrated by means of the said spool 1 and coils 2 and 3 in connection with a rectangular magnetic frame 45 formed preferably of laminations 46 bound together by any suitable means as rivets 47, and having a rectangular opening 48 adapted to receive the said spool 1 and core 41 therein with its axis in a plane parallel with the laminations, the said core being adapted to fit closely within said frame at its ends, thus constituting an ordinary shell type transformer. The coils 2 and 3 may then be connected to the primary and secondary circuits respectively. The primary circuit may connect to the regular power circuit of the laboratory and the secondary circuit may be connected for use in any way desired.

In order to show the principles of electro-magnetic or electro-dynamic repulsion, the said spool 1 and core 41 may be used in combination with either a separate unattached coil 49 closed upon itself, or an ordinary closed conducting ring 50 of any sort, preferably of copper in order to insure a large flow of induced current therein. The coil 2 is connected to a suitable source of alternating current, and the closed circuit coil 49 or ring 50 is then placed over one end of the core 41 adjacent to the spool whereupon it will be repelled or thrown off by the repulsion produced by the primary and induced alternating currents flowing simultaneously in opposite directions respectively, the primary current in the exciting coil 2 flowing in one direction and the induced current in the closed circuit element flowing in the opposite direction at any given instant. The strength of the field is increased and the repulsion effect is heightened by inclosing the spool 1 and core 41 in said magnet frame 45. These members may be assembled with the axis of the spool transverse to the plane of the frame laminations and with one end of the core 41 projecting somewhat from the spool toward the ring or coil to be repelled, as illustrated in Fig. 4. The induction member 49 or 50 may be suspended over the pole of the core and then when the primary circuit through coil 2 is closed the suspended member will be repelled and held away until the exciting circuit is broken, whereupon repulsion will cease and the suspended member will be returned by gravity to its lowermost position. The repulsion effect may be further illustrated by substituting a conductor plate or disk 51 for the annular member though with less force and efficiency. If the disk be held in place forcibly against repulsion it will heat by action of the heavy induced current. The same is true of the ring 50 and to some extent of the coil 49.

For showing the relative magnetic permeability of different materials the spool 1 is placed within the hollow frame 45 with its axis parallel to the laminations, and the coils 2 and 3 are connected in series to a source of direct current. The frame 45 is provided with an axial perforation 55 at one end to receive the rod 50 to be tested. A smooth iron plate 57 is provided to fit between the opposite end of the frame and the adjacent end of the spool to provide a suitable uniform bearing for the inner end of the test rod 56. The relative permeability is determined by measuring the force or mechanical pull required to withdraw the rod 56 when the winding 2—3 is energized by a given strength of current. The relative permeability of various samples of iron, one of which may be used as a standard, may be found by using test rods formed alike, and testing successively in the uniform constant field within the hollow spool 1. Any suitable means may be used as a dynamometer or scale for measuring the force, as for instance an ordinary spring balance 58. The spool 1 may be secured rigidly within the frame 45 by any simple well known means.

The improved system of electro-dynamic appliances and some of the several parts as made in accordance with this invention are especially adapted for use either alone or with other well known devices or instruments in making various experiments and demonstrations. For instance, the double-wound spool shown in Fig. 1 may be used as a resistance member in various experiments including fall of potential along the length of a resistance conductor through which a current is flowing. When said double-wound spool is used in combination with the core 41 numerous demonstrations may be conducted showing the principles governing transformers and choke coils. By combining one or more of said parts with certain other members or parts, and such additional apparatus and measuring instruments being used as may be desired, a great variety of tests may be conducted as will readily occur to an instructor skilled in the use of apparatus, such as usually included in the equipment of a physical laboratory or experimental room.

Although some of the more important of the specific applications and uses for the apparatus herein described have been illustrated, it is to be understood that no attempt has been made to illustrate or enumerate all of its uses, and it is to be understood further-more that various details of the construction shown as well as the arrangement of parts may be altered or omitted without departing from the spirit of this invention as defined by the following claims.

I claim:—

1. An educational appliance, comprising an induction coil, having a composite removable core the components of which are disposed lengthwise, and a composite open rectangular frame comprising laminations disposed parallel with the general plane of the frame, the dimensions of the coil and core and the inside dimensions of the frame being such as to admit of placing the coil and core in substantially close fitting relation within the frame in two different angular positions ninety degrees apart, in one position the axis of the coil and core being parallel with the frame laminations and general plane of the frame, and the magnetic circuit being closed to serve as a transformer, and in the other position the axis of the coil and core being perpendicular to the laminations and general plane of the frame, and the magnetic circuit being open to provide for demonstrating repulsion effects.

2. An educational appliance, comprising a shell type transformer including a rectangular laminated frame, a removable core and an interchangeable magnetizing coil, said frame having a perforation through one side adjacent to one end of the coil for the insertion of an iron test rod when the core is not present, said coil being somewhat shorter than the distance between the perforated side and the opposite side of said frame, and an iron plate applicable for insertion between the said opposite side of the frame and the adjacent end of the coil for making good mechanical contact with the inner end of the test rod.

3. An educational appliance, comprising a magnetic frame having a rectangular aperture, in combination with a hollow magnetizing coil and a removable magnetic core for said coil, said frame and coil being formed to fit together with the axis of the coil either parallel with or perpendicular to the general plane of the frame, said frame having a perforation in one side for coaxial alinement with said coil in its first mentioned position, substantially as described.

Signed at Chicago this 21st day of July, 1913.

ELMER ELLSWORTH BURNS.

Witnesses:
EDWIN PHELPS,
M. IRENE HUTCHINGS.

Copies of this patent may be obtained for five cents each, by addressing the "Commissioner of Patents, Washington, D. C."